(12) United States Patent
Ishii et al.

(10) Patent No.: US 11,940,048 B2
(45) Date of Patent: Mar. 26, 2024

(54) VALVE DEVICE

(71) Applicant: MIKUNI CORPORATION, Tokyo (JP)

(72) Inventors: Toshiaki Ishii, Kanagawa (JP); Makoto Koyama, Kanagawa (JP); Daisuke Takayama, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 418 days.

(21) Appl. No.: 17/197,067

(22) Filed: Mar. 10, 2021

(65) Prior Publication Data
US 2021/0396315 A1    Dec. 23, 2021

(30) Foreign Application Priority Data

Jun. 17, 2020  (JP) ................. 2020-104154

(51) Int. Cl.
*F16J 15/10*  (2006.01)
*F16J 15/30*  (2006.01)
*F16J 15/54*  (2006.01)

(52) U.S. Cl.
CPC .............. *F16J 15/10* (2013.01); *F16J 15/30* (2013.01); *F16J 15/54* (2013.01); *F04B 2201/0603* (2013.01)

(58) Field of Classification Search
CPC ...... F16K 1/2268; F16J 15/102; F16J 15/104; F16J 15/10
See application file for complete search history.

(56) References Cited

U.S. PATENT DOCUMENTS

| 4,042,747 | A | * | 8/1977 | Breton | ................. | C09K 3/1028 |
| | | | | | | 428/323 |
| 2015/0267814 | A1 | * | 9/2015 | Yoshida | ................. | F16L 23/18 |
| | | | | | | 264/103 |
| 2016/0025223 | A1 | * | 1/2016 | Ishihata | ................. | F16L 23/22 |
| | | | | | | 277/626 |
| 2016/0033043 | A1 | * | 2/2016 | Busby | ..................... | B64C 1/36 |
| | | | | | | 264/273 |
| 2019/0323612 | A1 | * | 10/2019 | Botella | ..................... | F01N 1/18 |

FOREIGN PATENT DOCUMENTS

JP    5335167    11/2013

* cited by examiner

*Primary Examiner* — Reinaldo Sanchez-Medina
*Assistant Examiner* — Nicole Gardner
(74) *Attorney, Agent, or Firm* — JCIPRNET (57) ABSTRACT

A valve device includes a body that defines a passage through which a fluid flows, a shaft that is movably supported with respect to the body and defines an axis, a valve element that is fixed to the shaft to open and close the passage; and a cylindrical bearing bush that movably supports the shaft with respect to the body, in which the bearing bush includes a mixed region in which a metal core material and expanded graphite are mixed with each other, and a first expanded graphite region made of only the expanded graphite such that the metal core material is not exposed in an inner circumferential side region in contact with an outer circumferential surface of the shaft.

8 Claims, 13 Drawing Sheets

VALVE DEVICE

CROSS-REFERENCE TO RELATED APPLICATION

This application claims the priority of Japan patent application serial no. 2020-104154, filed on Jun. 17, 2020. The entirety of the above-mentioned patent application is hereby incorporated by reference herein and made a part of this specification.

BACKGROUND

Technical Field

The present invention relates to a valve device in which a shaft to which a valve element opening and closing a passage is fixed is supported by a bearing bush (also referred to as a sliding bearing), and particularly to a valve device applied in a case in which a passage through which a high temperature exhaust gas passes is opened and closed as in an exhaust system of an engine or the like.

Description of Related Art

As a valve device of the related art, there is a valve device including a housing that defines a fluid passage, a valve that opens and closes the fluid passage, a valve shaft that is driven to open and close the valve, and a seal member that is fitted into the housing to rotatably support and seal the valve shaft, in which the seal member has a shaft seal structure formed by pressing a carbon material with a sheet-like material obtained by knitting a stainless steel wire into a mesh shape as a core material (aggregate) (for example, Patent Document 1).

Since the seal member is made by pressing a carbon material into a mesh-shaped sheet as an aggregate and filling a gap with the carbon material, the core material which is a stainless steel wire may be exposed on a sliding surface in contact with the valve shaft.

In this case, since the core material slides in direct contact with the valve shaft, abnormal noise or wear may occur due to the sliding. An increase in wear causes rattling of the valve shaft and the like, and thus there is concern that opening and closing operations of the valve may be hindered.

In order to cope with this, a ceramic bush may be used or surface treatment may be performed on the valve shaft, but this causes a decrease in productivity and an increase in cost.

PATENT DOCUMENTS

[Patent Document 1] Japanese Patent No. 5335167

SUMMARY

According to an embodiment of the present invention, there is provided a valve device including a body that defines a passage through which a fluid flows; a shaft that is movably supported with respect to the body and defines an axis; a valve element that is fixed to the shaft to open and close the passage; and a cylindrical bearing bush that movably supports the shaft with respect to the body, in which the bearing bush includes a mixed region in which a metal core material and expanded graphite are mixed with each other, and a first expanded graphite region made of only the expanded graphite such that the metal core material is not exposed in an inner circumferential side region in contact with an outer circumferential surface of the shaft.

BRIEF DESCRIPTION OF THE DRAWINGS

FIG. 4 is a sectional view along an axis of a shaft in the valve device illustrated in

FIG. 1.

DESCRIPTION OF THE EMBODIMENTS

According to an aspect of the present invention, there is provide a valve device capable of suppressing or preventing sliding abnormal noise and wear and also ensuring slidability to achieve suppression of cost increase, improvement of productivity, improvement of durability, improvement of functional reliability, and the like, in order to solve the problems of the related art.

According to one embodiment of the present invention, in the valve device, a configuration may be employed in which the shaft includes an abutting portion that abuts on one end surface of the bearing bush in a direction of the axis, and the bearing bush further includes a second expanded graphite region made of only the expanded graphite on a side of the one end surface in the direction of the axis.

According to another embodiment of the present invention, in the valve device, a configuration may be employed in which the bearing bush further includes a third expanded graphite region made of only the expanded graphite on a side of the other end surface in the direction of the axis.

According to another embodiment of the present invention, in the valve device, a configuration may be employed in which, in the bearing bush, the side of the one end surface and the side of the other end surface have the same shape.

According to another embodiment of the present invention, in the valve device, a configuration may be employed in which the bearing bush is a press-molded product obtained by press-molding a pressure-bonded sheet in which a metal mesh sheet made of the metal core material is sandwiched between expanded graphite sheets made of the expanded graphite and is pressure-bonded.

According to another aspect of the present invention, the valve device having the above-described configuration can suppress or prevent abnormal sliding noise and wear and also ensure slidability to achieve suppression of cost increase, improvement of productivity, improvement of durability, improvement of functional reliability, and the like.

Hereinafter, an embodiment of the present invention will be described with reference to the accompanying drawings.

A valve device M according to one embodiment includes, as illustrated in FIGS. 1 to 4, a body 10, a shaft 20 defining an axis S, a plate 30, a valve element 40, two bearing bushes 50, a cap 60, and a connection member 70.

Figure 3:
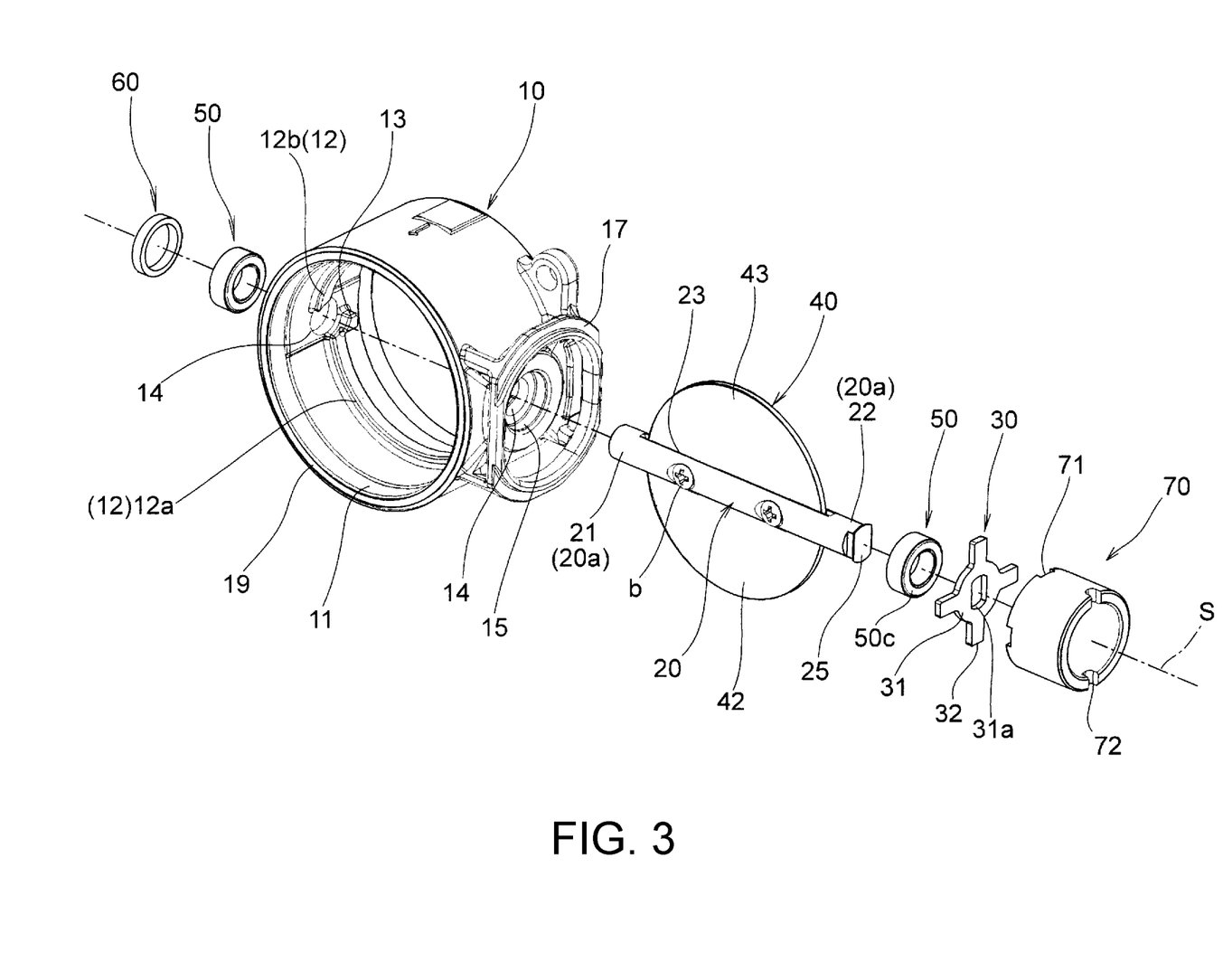
FIG. 3 is an exploded perspective view of the valve device illustrated in FIG. 1.
Figure 4:
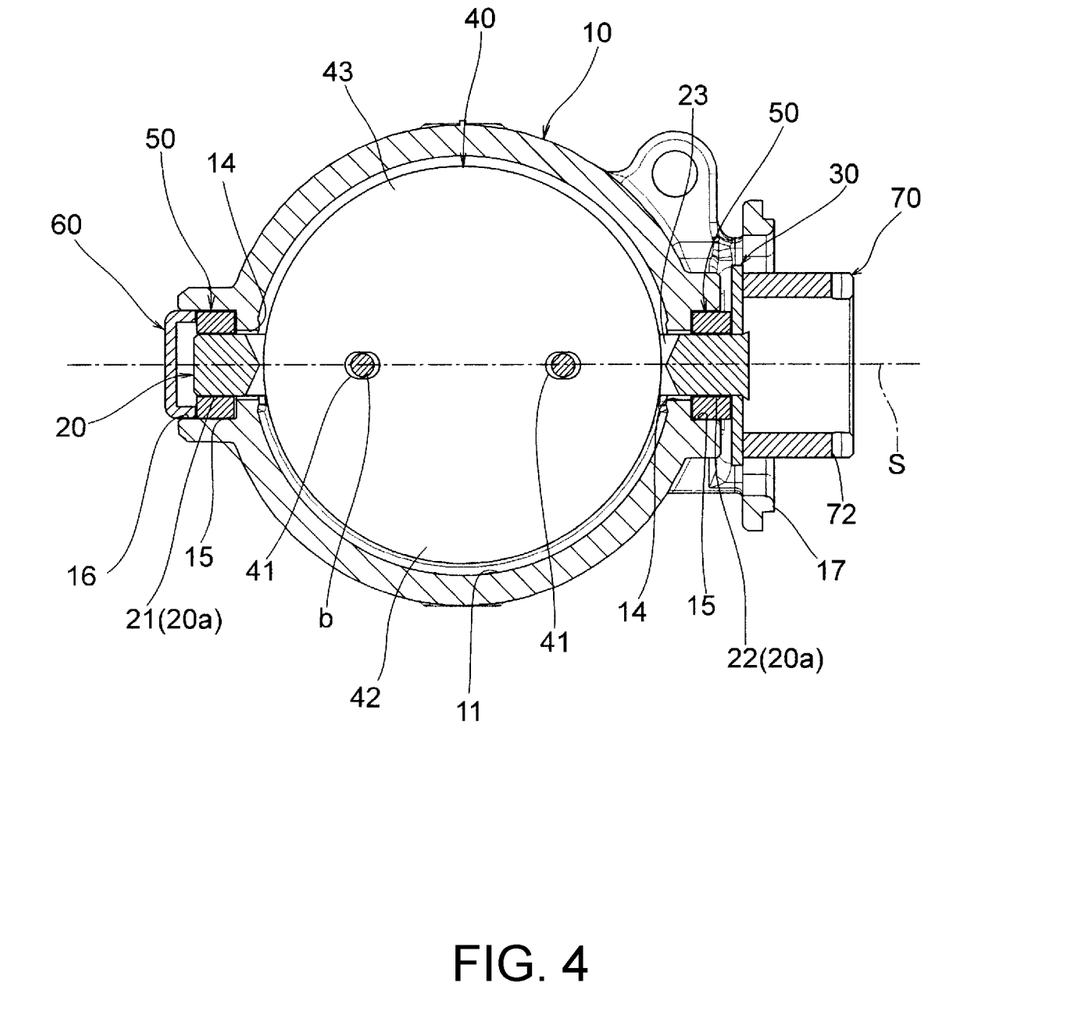

The body 10 is formed by casting a metal material such as stainless steel or iron according to, for example, a lost wax method, and includes a passage 11 through which a fluid passes, a seal portion 12 formed to protrude into the passage 11, a fully open stopper 13 formed to protrude into the passage 11, two shaft holes 14 through which the shaft 20 passes, two fitting holes 15 into which the bearing bushes 50 are fitted, a fitting portion 16 into which the cap 60 is fitted, a flange portion 17, a first connection portion 18, and a second connection portion 19.

The passage 11 is a cylindrical passage having a cylindrical section that has the center on a central line L and a predetermined inner diameter.

The seal portion 12 is formed by a first seal part 12a and a second seal part 12b that are divided in regions of the shaft holes 14 and are formed to protrude in a semi-arc shape.

The first seal part 12a defines an abutting surface on which the valve element 40 abuts at a position deviated from the center of the shaft hole 14 (axis S) to one side in a direction of the central line L.

The second seal part 12b defines an abutting surface on which the valve element 40 abuts at a position deviated from the center of the shaft hole 14 to the other side in the direction of the central line L.

The fully open stopper 13 defines an abutting surface on which the valve element 40 in a fully open state abuts at a position that is deviated from the center of the shaft hole 14 to one side in the direction of the central line L and is adjacent to the first seal part 12a.

The two shaft holes 14 are formed in a cylindrical shape having an inner diameter dimension with which a first shaft portion 21 and a second shaft portion 22 of the shaft 20 can be inserted thereinto in a noncontact manner on the axis S extending perpendicularly to the central line L.

The two fitting holes 15 are formed in a cylindrical shape having an inner dimension with which the bearing bush 50 can be tightly fitted thereinto without any gap at positions adjacent to the outside of the shaft holes 14 in the direction of the axis S.

The fitting portion 16 is formed outside one fitting hole 15 in the direction of the axis S such that the cap 60 can be fitted and fixed thereto or welded and fixed thereto after being inserted.

The flange portion 17 is attached with a drive actuator that rotationally drives the shaft 20, and is formed in a ring shape along with a leg part that protrudes from an outer wall of the body 10 in the direction of the axis S.

The first connection portion 18 and the second connection portions 19 are formed to be connected to an exhaust tube in a state in which the valve device M is interposed in the middle of the exhaust tube forming an exhaust passage of an engine.

The shaft 20 is formed in a columnar shape that extends in the direction of the axis S and defines an outer circumferential surface 20a having the same outer diameter dimension by using a metal material such as highly corrosion-resistant stainless steel.

Figure 1:
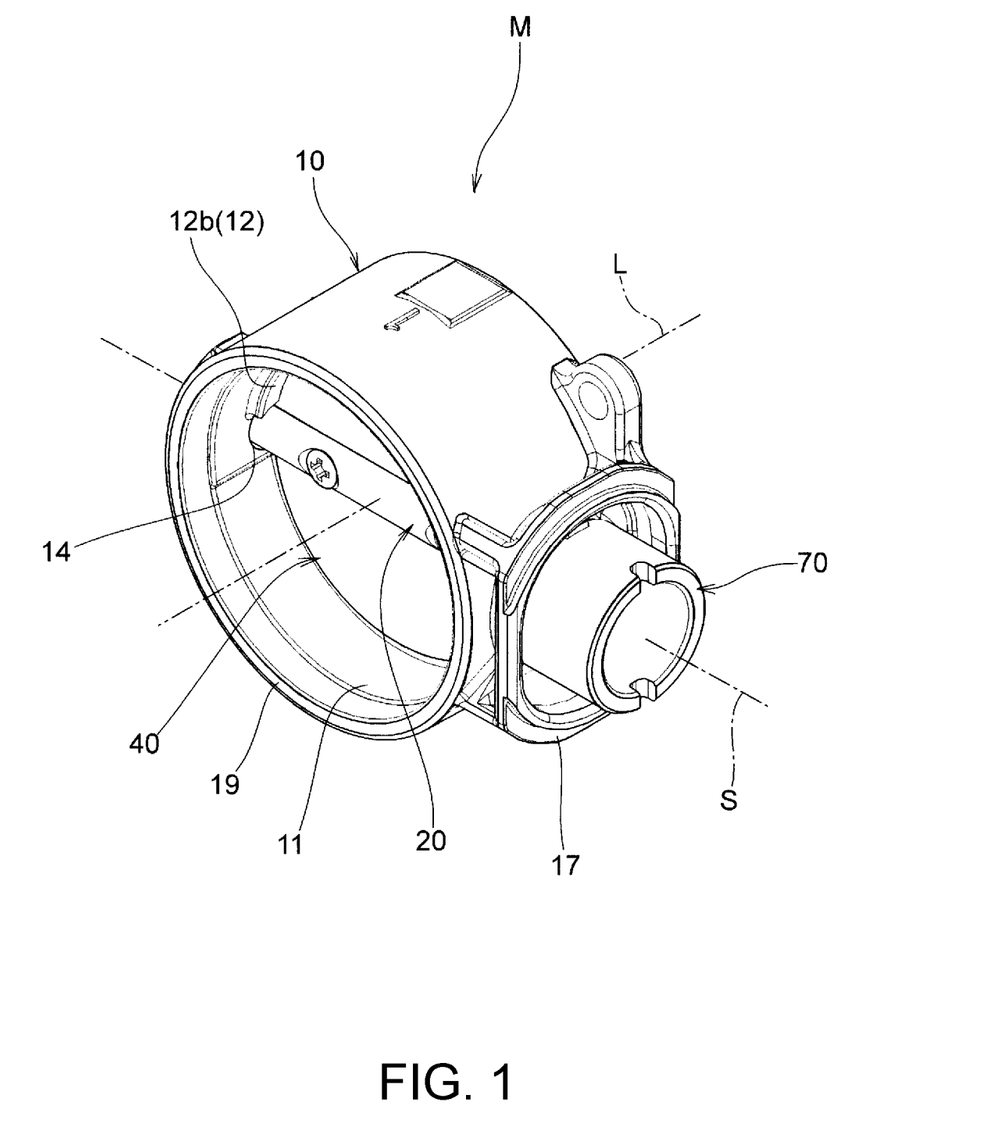
FIG. 1 illustrates a valve device according to an embodiment of the present invention, and is an external perspective view of the valve device from one side.
Figure 2:
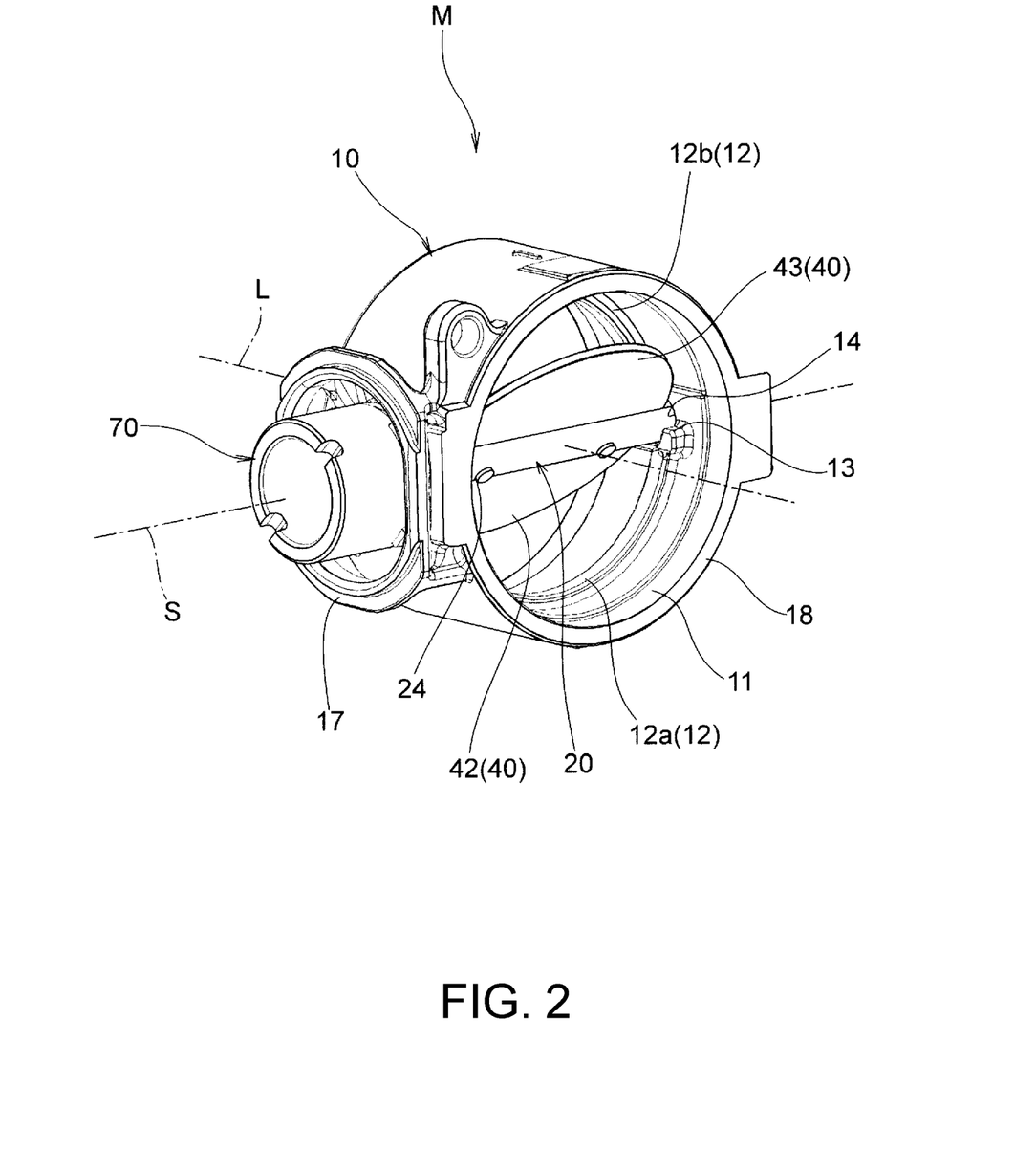
FIG. 2 is an external perspective view of the valve device illustrated in FIG. 1 from the other side.

As illustrated in FIGS. 2 and 3, the shaft 20 has the first shaft portion 21, the second shaft portion 22, a slit 23 into which the valve element 40 is inserted to be fixed, two screw holes 24 penetrating through the slit 23, and an end portion 25 formed to be connected to the outside of the second shaft portion 22.

The first shaft portion 21 and the second shaft portion 22 are inserted into the shaft holes 14 of the body 10 and are supported rotatably about the axis S by the bearing bush 50.

The slit 23 has a width dimension that allows the valve element 40 to be inserted thereinto.

The valve element 40 is inserted into the slit 23 and a screw b is screwed into the screw hole 24 to fix the valve element 40 to the shaft 20.

The end portion 25 defines a two-sided width portion to be fitted into and fixed to the plate 30 that is rotated integrally with the shaft 20.

The end portion 25 is caulked after being fitted into the plate 30.

The plate 30 is formed by using a thin stainless steel plate or the like, and includes a connection portion 31 and four engagement pieces 32 as illustrated in FIG. 3.

The connection portion 31 has a circular plate shape perpendicular to the axis S, and includes a rectangular fitting hole 31a to which the end portion 25 of the shaft 20 is fitted.

The four engagement pieces 32 are disposed at the same interval about the axis S to be engaged with engagement grooves 71 of the connection member 70, and are formed to protrude from the connection portion 31 in the direction perpendicular to the axis S.

The end portion 25 of the shaft 20 is fitted into and fixed to the plate 30 through caulking, and thus the plate 30 is rotated integrally with the shaft 20, receives bias force of a bias spring (not illustrated) in the direction of the axis S, and functions as an abutting portion that abuts on one end surface 50c of the bearing bush 50.

The valve element 40 is a butterfly valve formed in a disk shape centered on an intersection between the axis S and the central line L by using a metal material such as stainless steel, and includes, as illustrated in FIGS. 3 and 4, two holes 41 through which a screw b passes on the axis S, and a first semicircular plate 42 on one side and a second semicircular plate 43 on the other side with a straight line located on the axis S as a boundary.

The valve element 40 is fitted into the slit 23 of the shaft 20 and is fixed to the shaft 20 by screwing a screw b into the screw hole 24 of the shaft 20 through the circular hole 41 in a state in which the shaft 20 is fitted into the bearing bushes 50 and 50 through the shaft holes 14 and 14 of the body 10.

Here, in a fully closed state in which the valve element 40 fully closes the passage 11, the first semicircular plate 42 abuts on the first seal part 12a, and the second semicircular plate 43 abuts on the second seal part 12b.

On the other hand, in a fully open state in which the valve element 40 fully opens the passage 11, the second semicircular plate 43 abuts on the fully open stopper 13.

Figure 5:
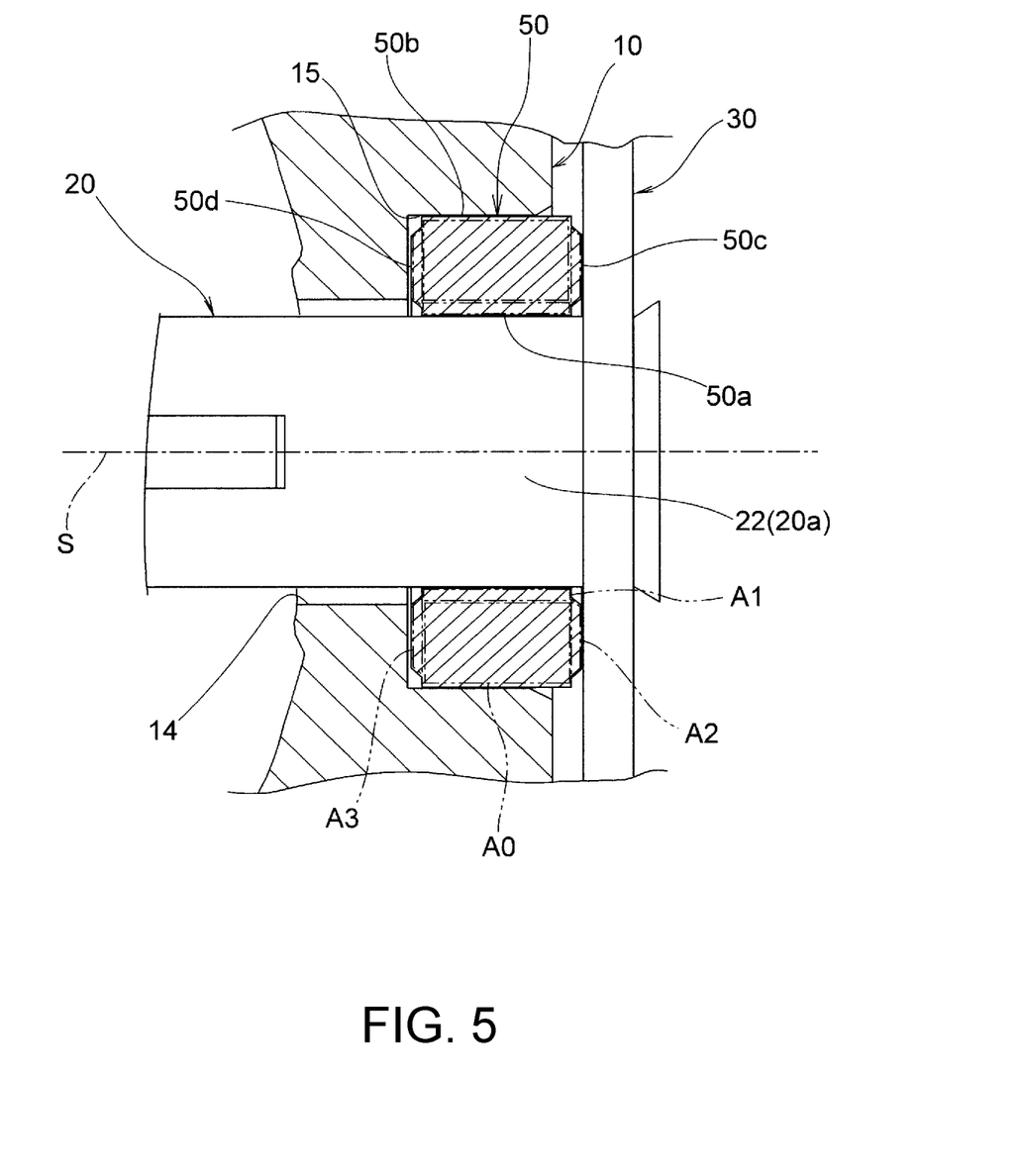
FIG. 5 is a partially enlarged sectional view illustrating a region of a bearing bush supporting one end side of the shaft in the sectional view of FIG. 4.
Figure 6:
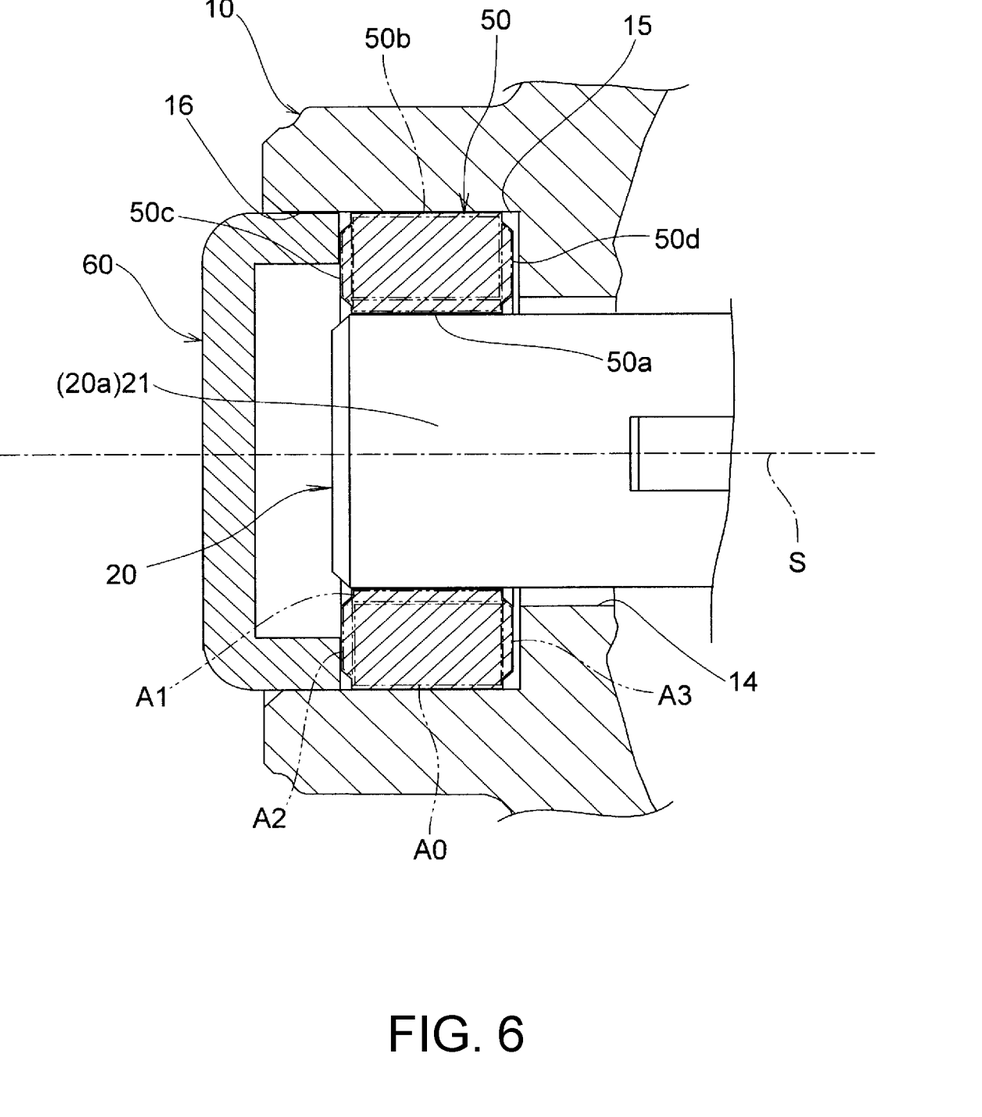
FIG. 6 is a partially enlarged sectional view illustrating a region of the bearing bush supporting the other end side of the shaft in the sectional view of FIG. 4.

As illustrated in FIGS. 5 and 6, the bearing bush 50 is formed in a cylindrical shape defining an inner circumferential surface 50a, an outer circumferential surface 50b, one end surface 50c, and the other end surface 50d.

The bearing bushes 50 are respectively fitted into the two fitting holes 15 of the body 10, and the inner circumferential surfaces 50a thereof come into contact with outer circumferential surfaces 20a of the first shaft portion 21 and the second shaft portion 22 of the shaft 20 such that the shaft 20 is movable, that is, the bearing bushes 50 function as sliding bearings that support the shaft 20 rotatably about the axis S.

Figure 7:
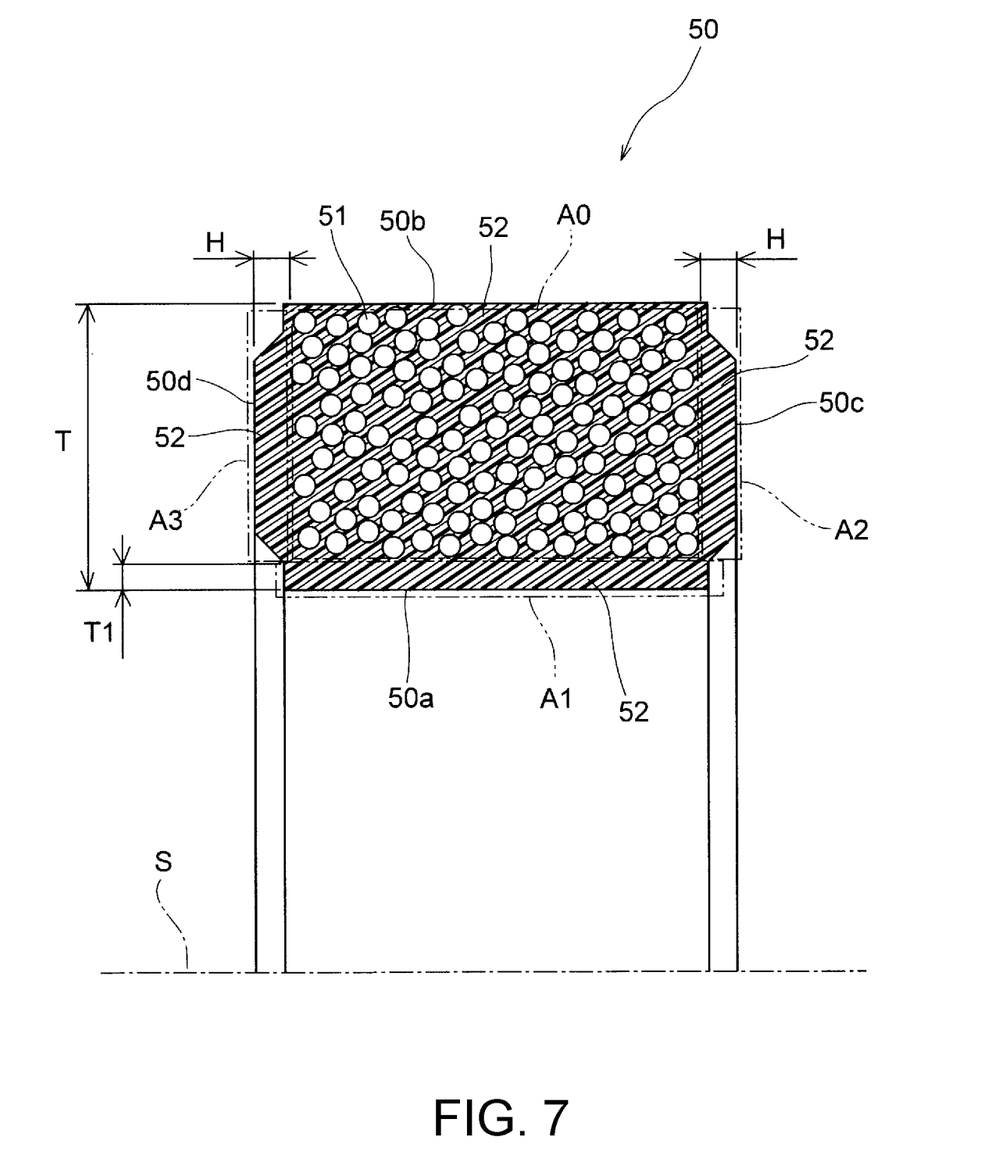
FIG. 7 is a sectional view of the bearing bush.

Here, the bearing bush 50 is formed as a composite in which a metal core material 51 is buried in expanded graphite 52, and includes, as illustrated in FIG. 7, a mixed region A0, a first expanded graphite region A1, a second expanded graphite region A2, and a third expanded graphite region A3.

The metal core material 51 has a skeleton structure in which a metal wire is woven into a mesh shape in a two-dimensional or three-dimensional manner.

Here, the material of the metal core material 51 is a metal having excellent heat resistance, bending workability, and the like and having mechanical strength as a bearing, and for example, stainless steel (SUS), iron, an aluminum alloy, or a nickel alloy may be employed.

The mixed region A0 is a cylindrical region centered on the axis S in which gaps between the metal core materials 51 are filled with the expanded graphite 52 and thus the metal core material 51 and the expanded graphite 52 are mixed with each other.

The first expanded graphite region A1 is a cylindrical region centered on the axis S, and is made of only the expanded graphite 52 such that the metal core material 51 is not exposed in the inner circumferential side region in contact with the outer circumferential surface 20a of the shaft 20.

The second expanded graphite region A2 is an annular plate-shaped region centered on the axis S, and is made of only the expanded graphite 52 such that the metal core material 51 is not exposed on a side of the one end surface 50c in the direction of the axis S.

The third expanded graphite region A3 is an annular plate-shaped region centered on the axis S, and is made of only the expanded graphite 52 such that the metal core material 51 is not exposed on a side of the other end surface 50d in the direction of the axis S.

Here, in the mixed region A0, a ratio of a volume Vm of the metal core material 51 to a volume Vg of the expanded graphite 52 is set in a range of Vm:Vg=2:8 to 5:5.

Because the volume ratio (Vm:Vg) is set in the range of 2:8 to 5:5 as described above, the gap between the metal core materials 51 can be reliably filled with the expanded graphite 52, and therefore mechanical strength can be ensured as a composite, and weight reduction, heat resistance, slidability, durability, and the like can be ensured.

The volume ratio (Vm:Vg) is not limited to the above range, and a ratio outside the above range may be used depending on a usage pattern.

In the first expanded graphite region A1, a layer thickness dimension T1 in a diameter direction perpendicular to the axis S from the inner circumferential surface 50a is set in a range of, for example, 0.05 mm to 0.2 mm Considering the usage environment of the valve device M, in a case where the layer thickness dimension T1 is smaller than 0.05 mm, there is concern that the metal core material 51 may be exposed when the inner circumferential surface 50a is worn, and on the other hand, when the layer thickness dimension T1 is larger than 0.2 mm, there is concern that the mechanical strength of the inner circumferential region may be weakened.

Therefore, the layer thickness dimension T1 of the first expanded graphite region A1 is set in the range of 0.05 mm to 0.2 mm, and thus exposure of the metal core material 51 can be reliably prevented, sufficient mechanical strength can be ensured, and the shaft 20 can be rotatably supported in a radial direction.

The layer thickness dimension T1 is not limited to the above range, and a value exceeding 0.2 mm may be employed depending on the usage pattern. In the present structure, the layer thickness dimension T1 may be adjusted as appropriate in a range not exceeding 0.6 mm.

In the first expanded graphite region A1, the layer thickness dimension T1 in the diameter direction perpendicular to the axis S from the inner circumferential surface 50a may be set in a range of 1% to 7% of a total thickness dimension T of the bearing bush 50 in the diameter direction.

As described above, the layer thickness dimension T1 of the first expanded graphite region A1 is set in the range of 1% to 7% of the total thickness T, and thus exposure of the metal core material 51 can be reliably prevented as described above, sufficient mechanical strength can be ensured, and the shaft 20 can be rotatably supported in the radial direction.

The layer thickness dimension T1 is not limited to the above range, and may be adjusted as appropriate and set in a range of 20% or less depending on the usage pattern.

Even if the expanded graphite 52 present in the first expanded graphite region A1 comes into close contact with the outer circumferential surface 20a of the shaft 20 due to its expansion or deformation, or a part of the expanded graphite 52 is transferred to the outer circumferential surface 20a of the shaft 20 due to the sliding of the shaft 20, the expanded graphite 52 functions as a sliding agent, and thus the shaft 20 is supported to rotate smoothly.

In a case where the bearing bush 50 is disposed to be adjacent to the plate 30 fixed to the shaft 20, the second expanded graphite region A2 functions as one end surface 50c on which the plate 30 as an abutting portion slidably abuts in the direction of the axis S.

Here, in the second expanded graphite region A2, a layer thickness dimension H in the direction of the axis S is set in a range of, for example, 0.05 mm to 0.2 mm.

Consequently, exposure of the metal core material 51 can be prevented, sufficient mechanical strength can be ensured, and the plate 30 that is rotated integrally with the shaft 20 can be rotatably supported in a thrust direction without causing sliding abnormal noise or the like.

The layer thickness dimension H is not limited to the above range, and a value exceeding 0.2 mm may be employed depending on the usage pattern. In the present structure, the layer thickness dimension H may be adjusted as appropriate in a range not exceeding 0.6 mm.

The third expanded graphite region A3 is formed in the same shape as that of the second expanded graphite region A2, and, in the present embodiment, in a case where the third expanded graphite region A3 does not receive any load in the thrust direction but is incorporated to face the plate 30, the third expanded graphite region A3 functions as an end surface on which the plate 30 as an abutting portion slidably abuts in the direction of the axis S in the same manner as the second expanded graphite region A2.

In other words, the bearing bush 50 is formed such that the side of the one end surface 50c has the same shape as that of the side of the other end surface 50d.

Therefore, since the bearing bush 50 has no directionality during assembly, the other end surface 50d provided with the third expanded graphite region A3 may be incorporated to face the plate 30 in an opposite direction to the state illustrated in FIG. 5.

As described above, since the bearing bush 50 has no directionality, it is possible to prevent the bearing bush 50 from being erroneously assembled. As illustrated in FIG. 6, the bearing bush 50 that supports the first shaft portion 21 of the shaft 20 does not need a function of receiving a thrust load, but is the same as the bearing bush 50 that supports the second shaft portion 22. Therefore, common components are used, and thus it is possible to reduce the number of components, suppress a cost increase, and prevent erroneous assembly.

The shaft 20 is supported rotatably about the axis S via the two bearing bushes 50 fitted into the body 10, and can thus be smoothly rotated compared with a case where the shaft 20 is directly supported by the shaft holes 14 by using the shaft holes 14 as bearing holes.

Since the bearing bush 50 is fitted to the body 10, there is no gap between the bearing bush 50 and the body 10, and, since one end surface 50c of the bearing bush 50 and the plate 30 abut on each other, a high temperature fluid can be prevented from leaking to the outside of the body 10.

The bearing bush 50 may be provided with a fourth outer circumferential expanded graphite region made of only the expanded graphite 52 having a cylindrical shape in the outer circumferential region extending inward in the diameter direction perpendicular to the axis S from the outer circumferential surface 50b.

The cap 60 is formed in a bottomed cylindrical shape by using a thin stainless steel plate or the like.

As illustrated in FIG. 6, the cap 60 is fitted to the fitting portion 16 of the body 10 to abut on or face one end surface 50c of the bearing bush 50, and covers the bearing bush 50 and the first shaft portion 21 of the shaft 20.

In the bearing bush 50, since the side of the one end surface 50c has the same shape as that of the side of the other end surface 50d, the bearing bush 50 may be incorporated in the opposite direction to the direction illustrated in FIG. 6 such that the cap 60 abuts on or faces the other end surface 50d.

As illustrated in FIG. 3, the connection member 70 is formed in a cylindrical shape by using a stainless steel plate or the like, and includes engagement grooves 71 and connection grooves 72.

In the connection member 70, the engagement pieces 32 of the plate 30 are engaged with the engagement grooves 71 and a rotation shaft of the drive actuator is connected to the connection grooves 72, and thus rotational force of the drive actuator is transmitted to the shaft 20.

Next, a method of manufacturing the bearing bush 50 will be described with reference to FIGS. 8 to 13.

Figure 9:
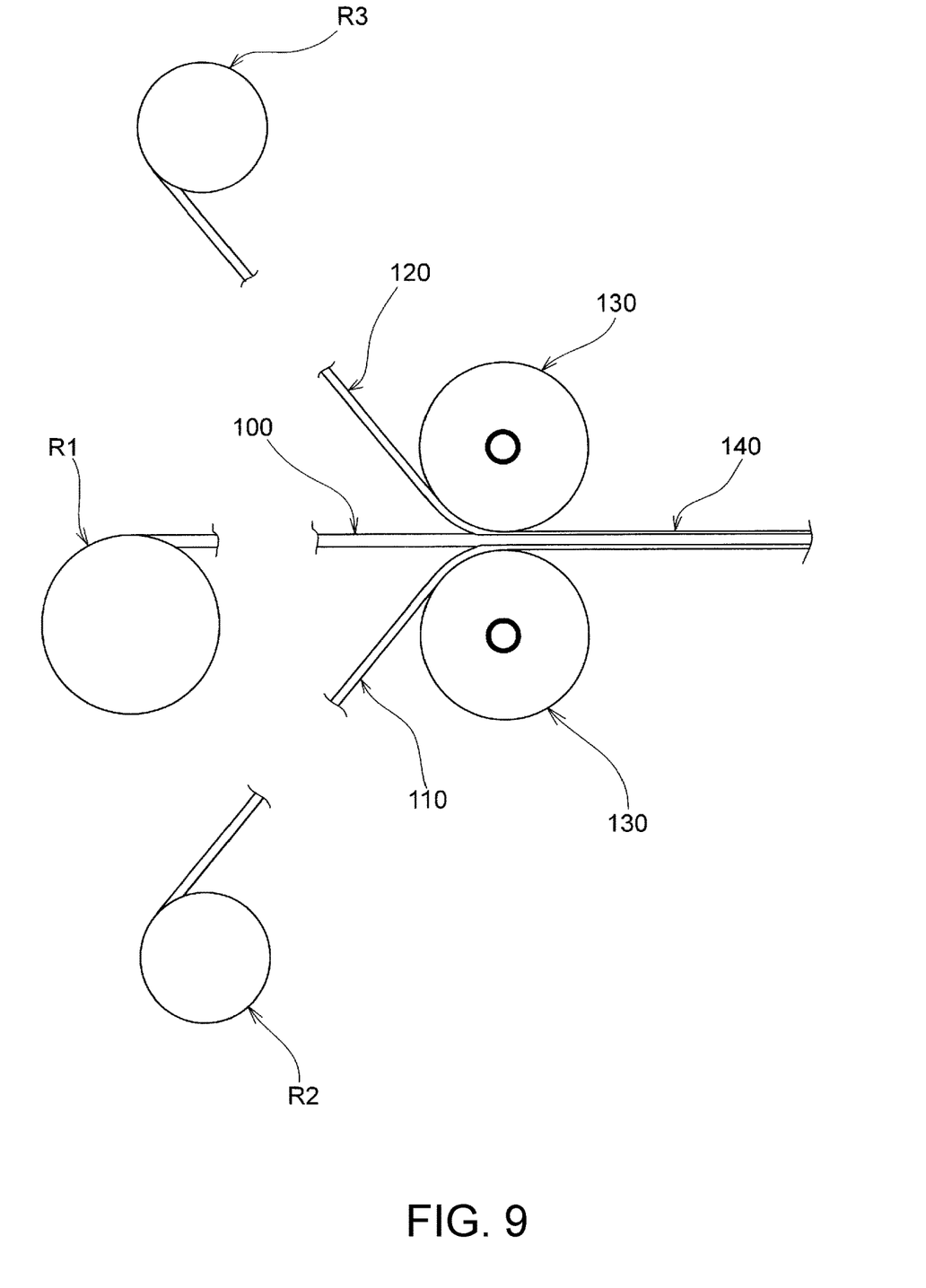
FIG. 9 illustrates the manufacturing method for the bearing bush included in the valve device illustrated in FIG. 1, and is a schematic diagram illustrating a state in which the metal mesh sheet and the two expanded graphite sheets illustrated in FIG. 8 are pressure-bonded to form a pressure-bonded sheet.

First, a metal mesh sheet 100 and two expanded graphite sheets 110 and 120 are prepared in the forms of base material coils R1, R2 and R3 as illustrated in FIG. 9.

The metal mesh sheet 100 serves as the metal core material 51 of the bearing bush 50. For example, a stainless steel wire is woven in a mesh shape through plain weave, twill weave, satin weave, or a combination thereof in a two-dimensional or three-dimensional manner, to form a plate-shaped strip having a width dimension W1 and a thickness dimension t1 as illustrated in FIG. 8.

Figure 8:
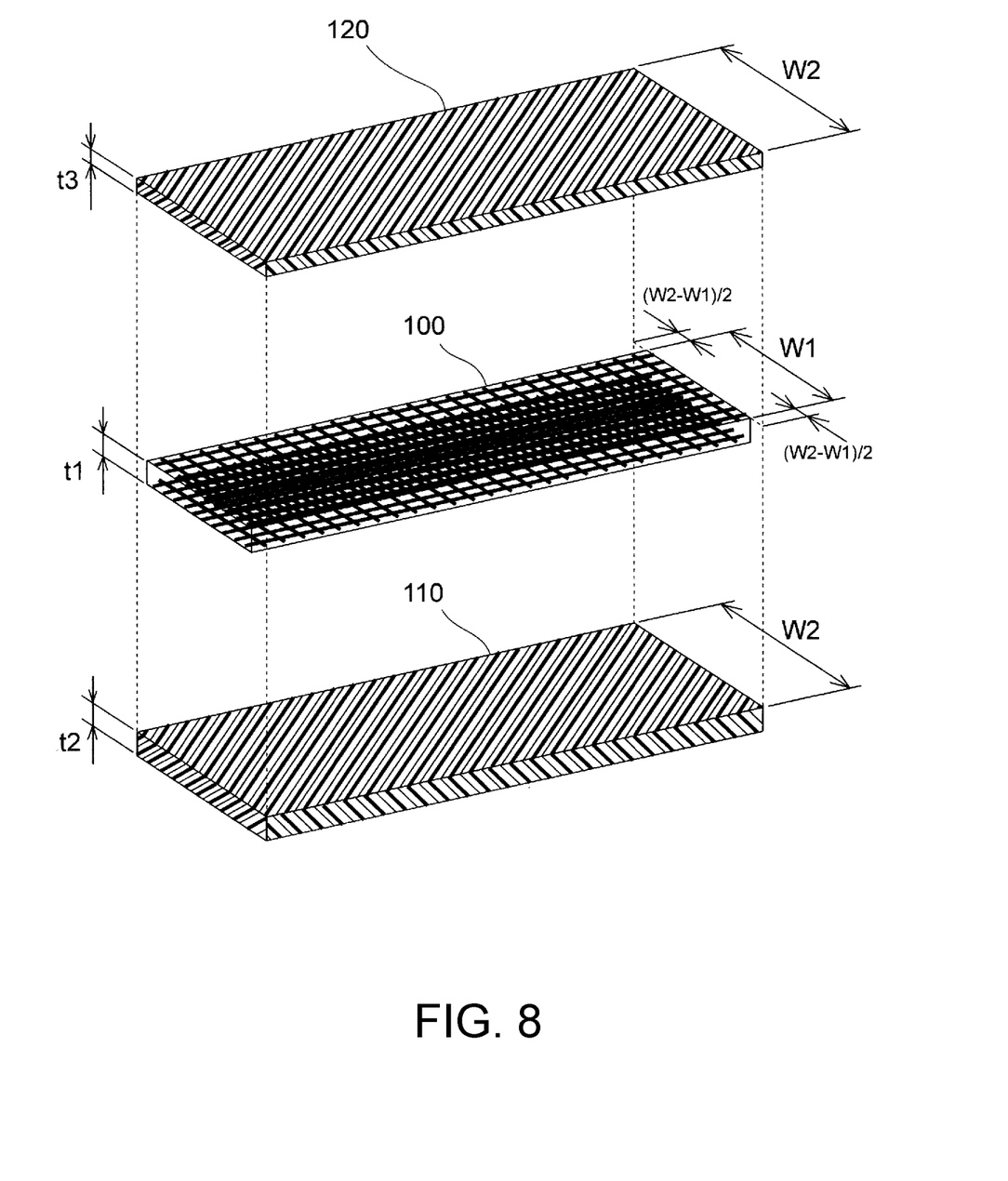
FIG. 8 illustrates a manufacturing method for the bearing bush included in the valve device illustrated in FIG. 1, and is a partial perspective view illustrating a metal mesh sheet and two expanded graphite sheets disposed to sandwich the metal mesh sheet therebetween.

The expanded graphite sheet 110 serves as the expanded graphite 52 formed on the inner circumferential surface 50a side of the bearing bush 50 and the gap region of the metal core material 51 after molding, and forms a plate-shaped strip having a width dimension W2 and a thickness dimension t2 as illustrated in FIG. 8.

The expanded graphite sheet 120 serves as the expanded graphite 52 formed on the outer circumferential surface 50b side of the bearing bush 50 and the gap region of the metal core material 51 after molding, and forms a plate-shaped strip having the width dimension W2 and a thickness dimension t3 as illustrated in FIG. 8.

Here, the width dimension W2 of the expanded graphite sheets 110 and 120 is set to be larger than the width dimension W1 of the metal mesh sheet 100.

As described above, a part of the expanded graphite sheets 110 and 120 having a long width dimension (W2-W1) severs as the expanded graphite 52 formed on the side of the one end surface 50c and the side of the other end surface 50d of the bearing bush 50 after molding.

As illustrated in FIG. 9, the metal mesh sheet 100 and the two expanded graphite sheets 110 and 120 are pulled out from the base material coils R1, R2 and R3 and are pressure-bonded by a pair of pressing rollers 130 to form a pressure-bonded sheet 140.

Figure 10:
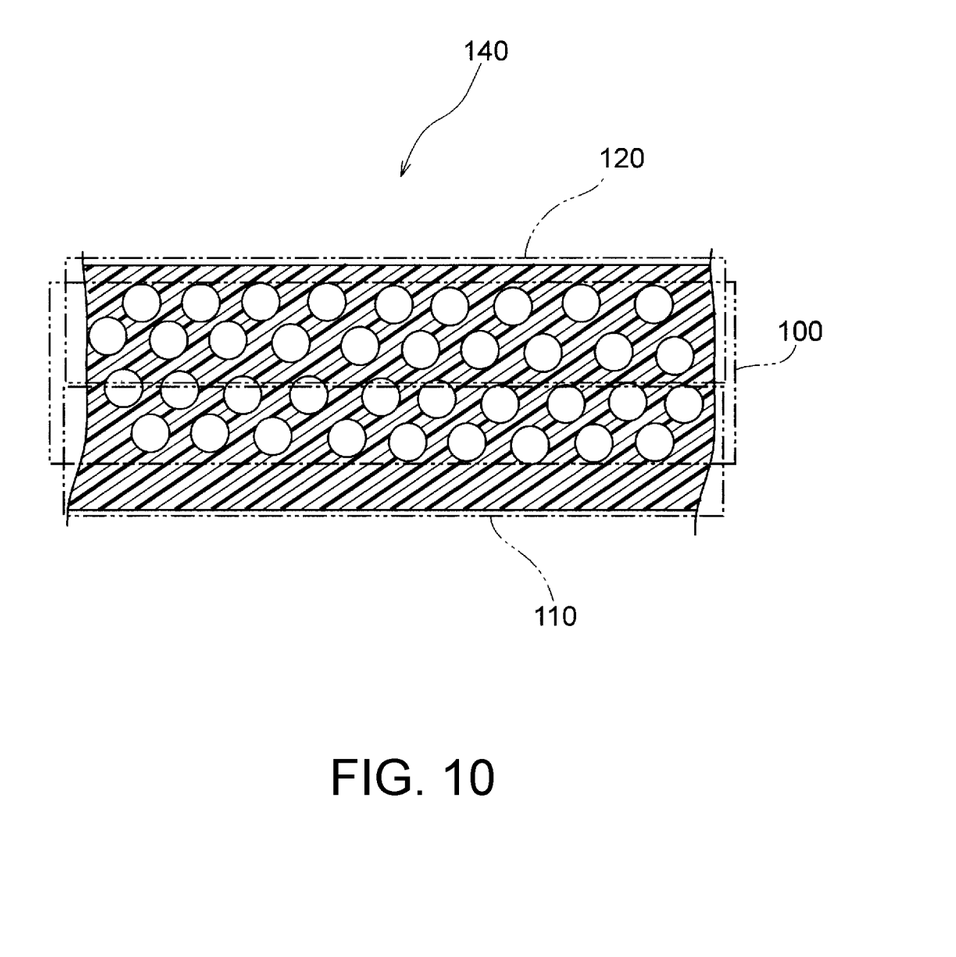
FIG. 10 is a partial sectional view schematically illustrating a section of the pressure-bonded sheet formed according to the pressure-bonding method illustrated in FIG. 9.

As illustrated in FIG. 10, the pressure-bonded sheet 140 is crushed such that the expanded graphite sheets 110 and 120 sandwich the metal mesh sheet 100, and gaps of the metal mesh sheet 100 are filled with expanded graphite.

In the pressure-bonding step, the thickness dimension t1 of the mesh sheet 100, the thickness dimension t2 of the expanded graphite sheet 110, and the thickness dimension t3 of the expanded graphite sheet 120 are adjusted as appropriate such that the expanded graphite sheet 110 is not completely buried in the gap of the metal mesh sheet 100, that is, the first expanded graphite region A1 made of only the expanded graphite 52 remains in a cylindrical layer shape after molding.

Figure 11:
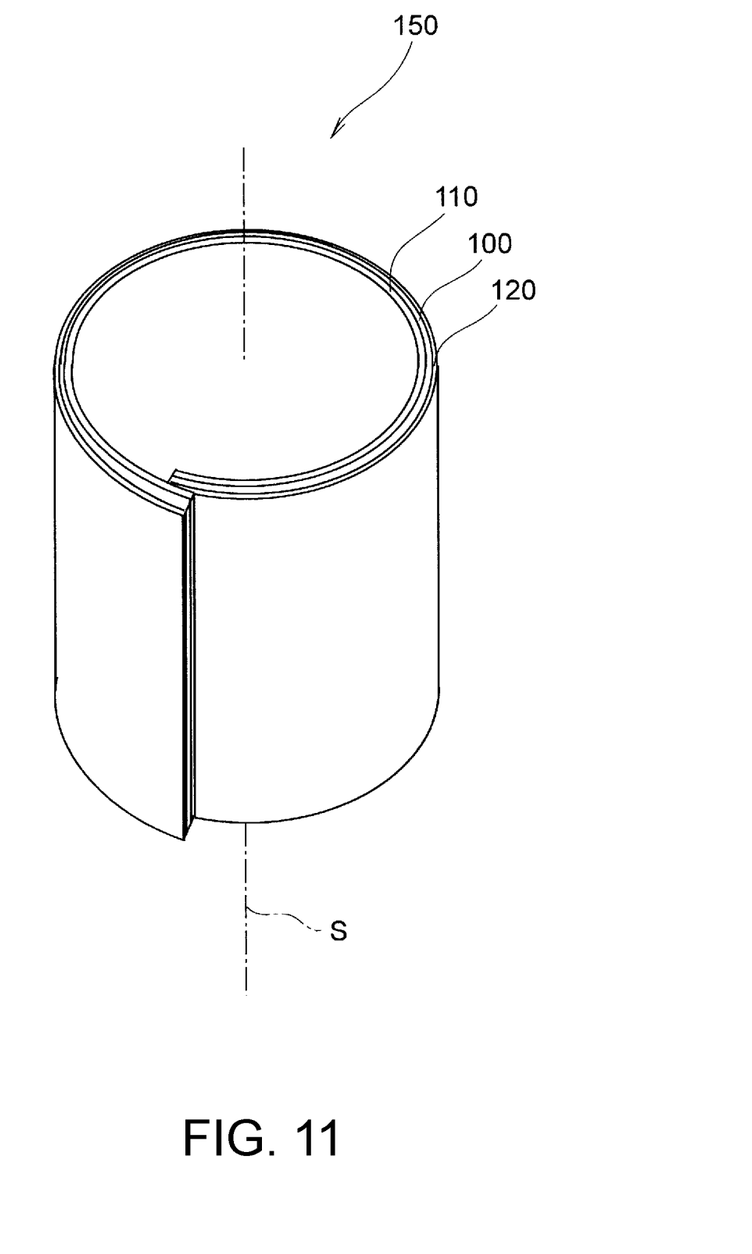
FIG. 11 illustrates the manufacturing method for the bearing bush included in the valve device illustrated in FIG. 1, and is a perspective view illustrating an intermediate product obtained by transforming the pressure-bonded sheet formed according to the pressure-bonding method illustrated in FIG. 9 into a cylindrical shape.

Next, the pressure-bonded sheet 140 is cut to a predetermined length, and is processed into a cylindrical shape such that both ends partially overlap each other to form an intermediate product 150 as illustrated in FIG. 11.

Next, the intermediate product 150 is press-molded by using a mold 160 to form the bearing bush 50 as a press-molded product.

Figure 12:
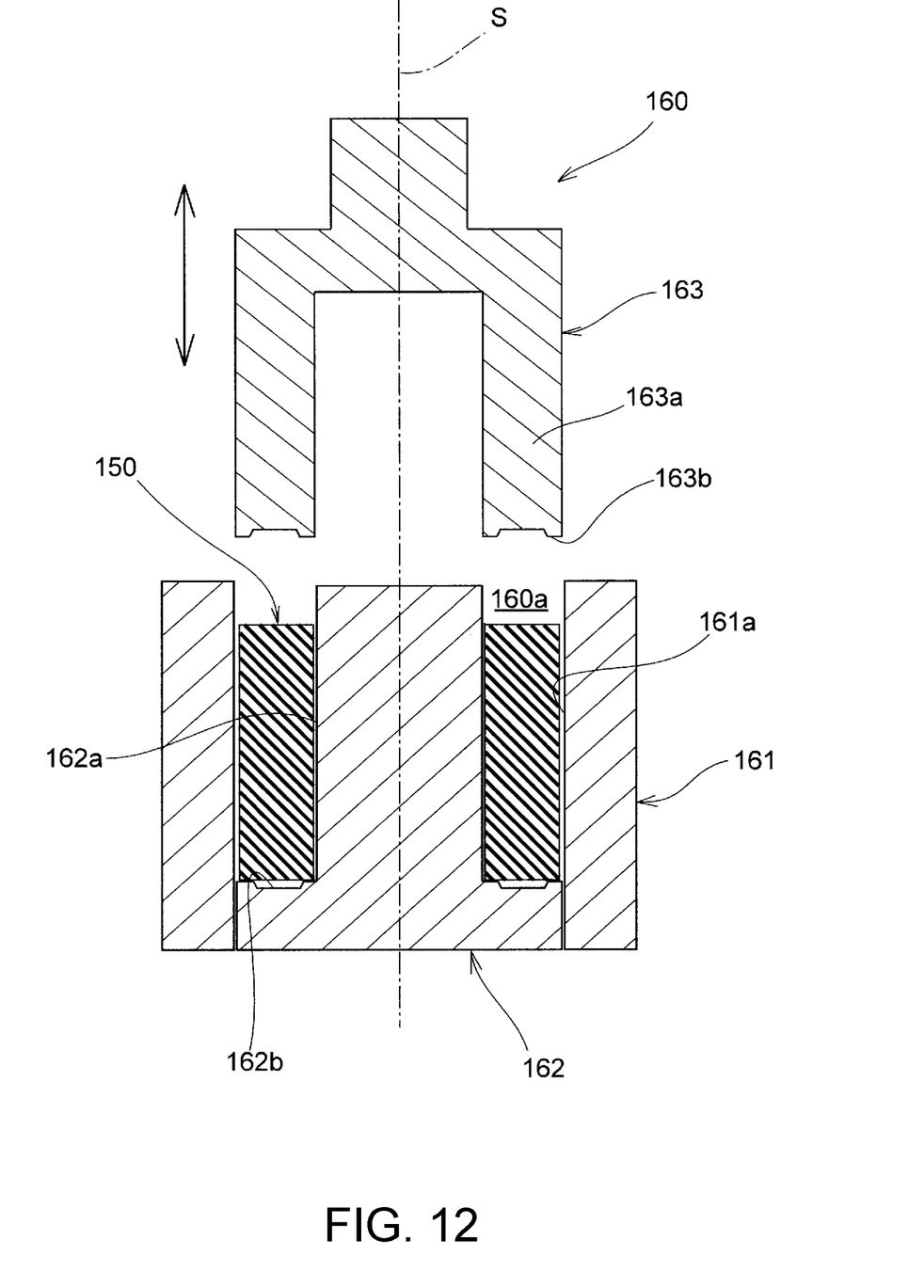
FIG. 12 is a sectional view schematically illustrating a state in which the cylindrical intermediate product illustrated in FIG. 11 is press-molded by a mold to form the bearing bush.

Here, as illustrated in FIG. 12, the mold 160 includes an outer mold 161, a lower mold 162, and an upper mold 163.

The outer mold 161 has a cylindrical shape and includes an inner circumferential surface 161a for forming the outer circumferential surface 50b of the bearing bush 50.

The lower mold 162 includes a columnar portion 162a for forming the inner circumferential surface 50a of the bearing bush 50, and an annular end surface 162b for forming one end surface 50c of the bearing bush 50.

The upper mold 163 includes a cylindrical portion 163a that can be fitted into an annular recess 160a defined by the inner circumferential surface 161a of the outer mold 161 and the columnar portion 162a of the lower mold 162, and an annular end surface 163b for forming the other end surface 50d of the bearing bush 50.

In the press step, the intermediate product 150 that is fitted into the recess 160a of the mold 160 is pressed by the upper mold 163, and is compressed by a predetermined amount in the direction of the axis S.

As a result, the metal core materials 51 formed by the metal mesh sheet 100 are modified to be closer to each other, and the expanded graphite 52 formed by the expanded graphite sheets 110 and 120 is modified to be appropriately dispersed, so that the bearing bush 50 having an increased density of the composite as a whole, is obtained as a press-molded product.

Figure 13:
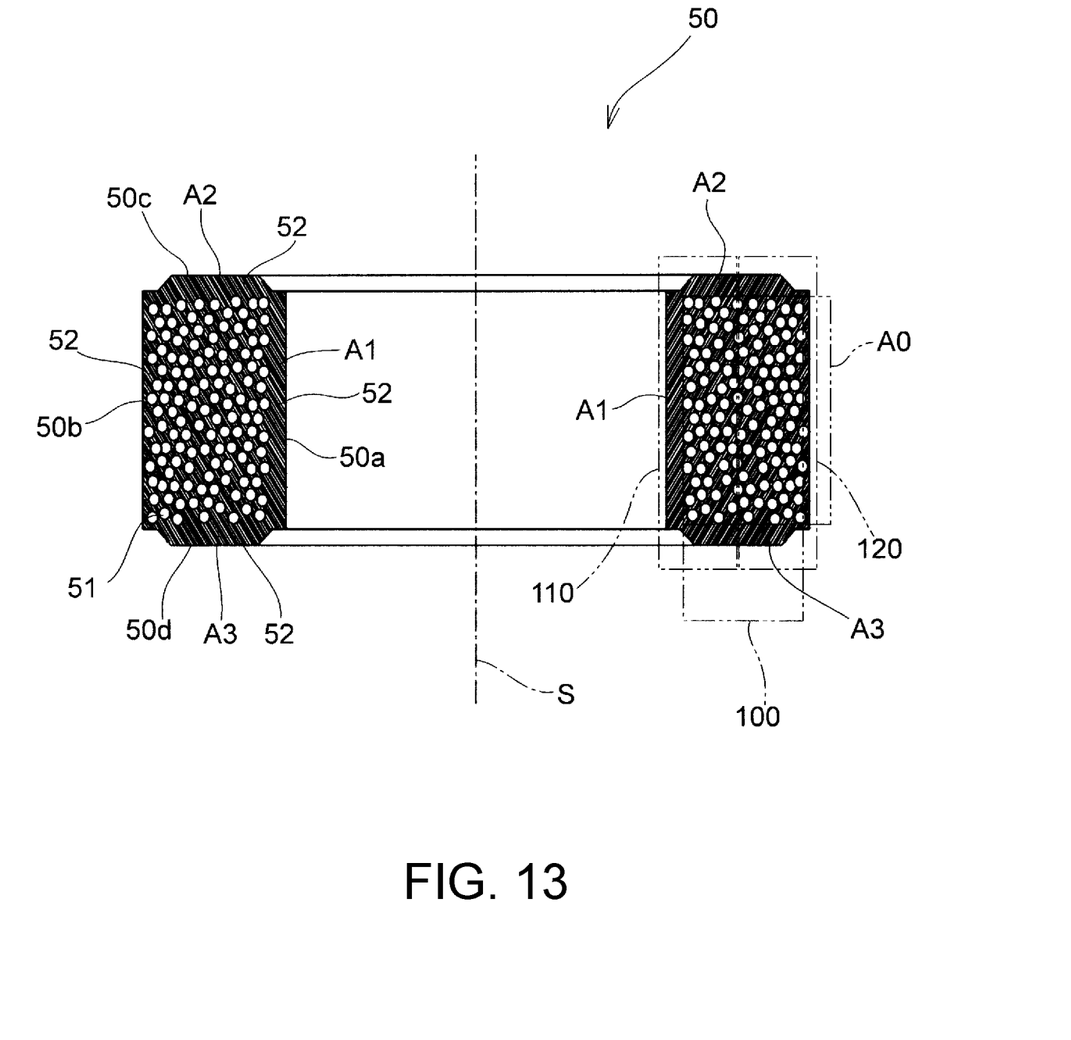
FIG. 13 is a sectional view along the axis of the bearing bush formed through press molding illustrated in FIG. 12.

As illustrated in FIG. 13, the bearing bush 50 obtained according to the above manufacturing steps is formed as a composite of the metal core material 51 and the expanded graphite 52, including the mixed region A0 in which the metal core material 51 and the expanded graphite 52 are mixed with each other, the first expanded graphite region A1 made of only the expanded graphite 52 on the inner circumferential surface 50a side, the second expanded graphite region A2 made of only the expanded graphite 52 on the side of the one end surface 50c in the direction of the axis S, and the third expanded graphite region A3 made of only the expanded graphite 52 on the side of the other end surface 50d in the direction of the axis S.

As described above, the bearing bush 50 is obtained as a press-molded product obtained by press-molding the pressure-bonded sheet 140 in which the metal mesh sheet 100 made of the metal core material 51 is sandwiched between the expanded graphite sheets 110 and 120 made of the expanded graphite 52 and is pressure-bonded.

Therefore, it is possible to achieve cost reduction, productivity improvement, and the like when manufacturing the bearing bush 50 compared with a case of forming the bearing bush 50 through cutting or the like.

Next, a description will be made of an operation when the valve device M is applied to an exhaust system of an engine mounted on an automobile.

Here, the drive of a drive actuator is controlled as appropriate on the basis of control signals output from a control unit by using various pieces of information regarding a traveling state of the automobile and a driving state of the engine.

For example, in a case where an exhaust passage is fully opened, the shaft 20 is rotated in one direction by the drive actuator, and the valve element 40 abuts on the fully open stopper 13. Consequently, the passage 11 is fully opened.

On the other hand, in a case where an exhaust passage is fully closed, the shaft 20 is rotated in the other direction by the drive actuator, and the valve element 40 abuts on the seal portion 12. Consequently, the passage 11 is fully closed.

In a case where an exhaust gas flowing through the exhaust passage is controlled to a predetermined amount, the shaft 20 is appropriately rotated in one direction or the other direction by the drive actuator, the valve element 40 is adjusted to a desired opening, and thus a flow rate of the exhaust gas flowing through the passage 11 is adjusted.

In the above-described way, the valve element 40 is controlled to be opened and closed with high accuracy not only in a fully open state and a fully closed state but also in an intermediate opening state narrowed down to a predetermined opening by the rotational drive force of the drive actuator. Therefore, a flow rate can be controlled with high accuracy to a desired flow rate, and various types of driving control based on the control can be performed.

In particular, in the valve device M according to the above embodiment, the bearing bush 50 including the first expanded graphite region A1 made of only the expanded graphite 52 is employed on the inner circumferential surface 50a side in contact with the outer circumferential surface 20a of the shaft 20. Therefore, sliding abnormal noise or wear can be suppressed or prevented, and durability is improved. The expanded graphite 52 is interposed in the region of the outer circumferential surface 20a of the shaft 20, and thus a rotational operation of the shaft 20 becomes smoother and the functional reliability is improved.

In the above embodiment, a description has been made of the form in which the body 10 that defines the cylindrical passage 11 as a body and the circular butterfly valve as the valve element 40 are employed, and the bearing bush 50 rotatably supports the shaft 20, but the present invention is not limited thereto.

For example, in a form in which the valve element fixed to the shaft is a poppet valve and the shaft reciprocates in the direction of the axis S, the bearing bush of the present invention may be configured to movably support the shaft in the axis direction. The valve element may be oval or quadrangular instead of circular.

In the above embodiment, in the configuration including the plate 30 as an abutting portion provided on the shaft 20, the bearing bush 50 having one end surface 50c that receives a thrust load in the direction of the axis S has been described, but is not limited thereto, and may be configured as a bearing bush that simply receives a radial load without receiving the thrust load.

In the above embodiment, a description has been made of the case where the first expanded graphite region A1 formed in the bearing bush 50 is integrally formed with the mixed region A0 through press molding, but the present invention is not limited to this, and, as long as mechanical strength is ensured and peeling or the like does not occur, a configuration may be employed in which the first expanded graphite region is formed as a clearly distinguishable layer and is joined to the layer of the mixed region A0.

In the above embodiment, a description has been made of the bearing bush 50 that has a cylindrical shape as a form of a bearing bush and of which the entire inner circumferential surface 50a is in contact with the outer circumferential surface 20a of the shaft 20, but the present invention is not limited thereto, and a bearing bush having a form in which a part of an inner circumferential surface of the bearing bush is in contact with the outer circumferential surface 20a of the shaft 20 may be used.

In the above embodiment, a description has been made of the configuration employing the connection member 70 that transmits rotational drive force to the shaft 20, but the present invention is not limited thereto, and other forms may be employed as long as drive force of the drive actuator is transmitted.

In the above embodiment, the valve device M used for an exhaust system of an engine has been described, but is not limited thereto, and may be applied as a valve device that adjusts a flow of a fluid other than the exhaust system.

As described above, the valve device of the present invention can suppress or prevent sliding abnormal noise and wear and can ensure slidability to achieve suppression of cost increase, improvement of productivity, improvement of durability, improvement of functional reliability, and the like, and is thus applicable to an exhaust system of an automobile or the like, and is useful for other fields handling fluids.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A valve device, comprising:
a body that defines a passage through which a fluid flows;
a shaft that is movably supported with respect to the body and defines an axis;
a valve element that is fixed to the shaft to open and close the passage; and
a cylindrical bearing bush that movably supports the shaft with respect to the body,
wherein the cylindrical bearing bush includes a mixed region in which a metal core material and expanded graphite are mixed with each other, and a first expanded graphite region in which only the expanded graphite exists such that the metal core material is not exposed in an inner circumferential side region in contact with an outer circumferential surface of the shaft,
in the first expanded graphite region, a layer thickness dimension in a diameter direction perpendicular to the axis from an inner circumferential surface of the cylindrical bearing bush is in a range of 0.05 mm to 0.2 mm.

2. The valve device according to claim 1,
wherein the shaft includes an abutting portion that abuts on one end surface of the cylindrical bearing bush in a direction of the axis, and
wherein the cylindrical bearing bush further includes a second expanded graphite region in which only the expanded graphite exists on a side of the one end surface in the direction of the axis.

3. The valve device according to claim 2,
wherein the cylindrical bearing bush further includes a third expanded graphite region in which only the expanded graphite exists on a side of the other end surface in the direction of the axis.

4. The valve device according to claim 3,
wherein, in the cylindrical bearing bush, the side of the one end surface and the side of the other end surface have the same shape.

5. The valve device according to claim 1,
wherein the cylindrical bearing bush is a press-molded product obtained by press-molding a pressure-bonded sheet in which a metal mesh sheet made of the metal core material is sandwiched between expanded graphite sheets made of the expanded graphite and is pressure-bonded.

6. The valve device according to claim 2,
wherein the cylindrical bearing bush is a press-molded product obtained by press-molding a pressure-bonded sheet in which a metal mesh sheet made of the metal core material is sandwiched between expanded graphite sheets made of the expanded graphite and is pressure-bonded.

7. The valve device according to claim 3,
wherein the cylindrical bearing bush is a press-molded product obtained by press-molding a pressure-bonded sheet in which a metal mesh sheet made of the metal core material is sandwiched between expanded graphite sheets made of the expanded graphite and is pressure-bonded.

8. The valve device according to claim 4,
wherein the cylindrical bearing bush is a press-molded product obtained by press-molding a pressure-bonded sheet in which a metal mesh sheet made of the metal core material is sandwiched between expanded graphite sheets made of the expanded graphite and is pressure-bonded.

* * * * *